(12) United States Patent
Murb

(10) Patent No.: US 7,273,365 B2
(45) Date of Patent: Sep. 25, 2007

(54) GRANULATOR FOR PRODUCING A GRANULATE MADE OF MOLTEN PLASTIC

(75) Inventor: Reinhardt-Karsten Murb, Aschaffenburg (DE)

(73) Assignee: Rieter Automatik GmbH, Grossotheim (DE)

( * ) Notice: Subject to any disclaimer, the term of this patent is extended or adjusted under 35 U.S.C. 154(b) by 25 days.

(21) Appl. No.: 10/542,429

(22) PCT Filed: Jan. 15, 2004

(86) PCT No.: PCT/EP2004/000245

§ 371 (c)(1),
(2), (4) Date: Aug. 18, 2005

(87) PCT Pub. No.: WO2004/065090

PCT Pub. Date: Aug. 5, 2004

(65) Prior Publication Data

US 2006/0121139 A1   Jun. 8, 2006

(30) Foreign Application Priority Data

Jan. 23, 2003   (DE) ................. 103 02 645

(51) Int. Cl.
*B29B 9/10*   (2006.01)
(52) U.S. Cl. ........................... 425/67; 425/313
(58) Field of Classification Search .......... 425/67, 425/311, 313
See application file for complete search history.

(56) References Cited

U.S. PATENT DOCUMENTS

| | | | | |
|---|---|---|---|---|
| 416,194 A * | 12/1889 | Tesla | ............ | 310/166 |
| 824,645 A | 6/1906 | Gyllenberg | | |
| 2,524,751 A | 10/1950 | Berger | ............ | 18/12 |
| 3,317,957 A | 5/1967 | Heston et al. | ............ | 18/12 |
| 3,685,751 A | 8/1972 | Anders | ............ | 241/256 |
| 3,912,434 A | 10/1975 | Nagahara et al. | ............ | 425/142 |
| 4,728,276 A | 3/1988 | Pauley et al. | ............ | 425/67 |
| 5,223,279 A | 6/1993 | Lambertus | ............ | 425/186 |
| 5,435,713 A | 7/1995 | Yamasaki et al. | ............ | 425/311 |
| 6,332,765 B1 * | 12/2001 | Spelleken | ............ | 425/67 |
| 6,663,372 B2 * | 12/2003 | Ready et al. | ............ | 425/67 |
| 2002/0150641 A1 | 10/2002 | Ready et al. | ............ | 425/67 |
| 2006/0112805 A1 * | 6/2006 | Chszaniecki et al. | ............ | 83/698.21 |

FOREIGN PATENT DOCUMENTS

DE   607 673 C   1/1935

(Continued)

OTHER PUBLICATIONS

Perry's Chemical Engineers' Handbook, Sixth Ed., McGraw-Hill Book Co., p. 24-4.*

*Primary Examiner*—Robert Davis
*Assistant Examiner*—Marissa W. Chaet
(74) *Attorney, Agent, or Firm*—Steptoe & Johnson LLP

(57) ABSTRACT

The invention relates to a granulator for producing granulate from molten plastic with a cutter head displaceable over an adjustment range, said cutter head cooperating with a die plate dispensing the plastic strands, said cutter head being connected to a drive shaft of a drive motor containing a stator and a drive rotor and being axially displaceable with respect to the die plate. The drive rotor is axially displaceable over the adjustment range by means of a linear adjustment element and is fixable in said range.

4 Claims, 3 Drawing Sheets

FOREIGN PATENT DOCUMENTS

| | | |
|---|---|---|
| DE | 0 221 228 | 5/1987 |
| DE | 44 08 235 C1 | 2/1995 |
| DE | 198 46 286 A1 | 4/2000 |
| DE | 201 17 461 U1 | 3/2002 |
| WO | WO 01/94088 | 12/2001 |

* cited by examiner

GRANULATOR FOR PRODUCING A GRANULATE MADE OF MOLTEN PLASTIC

The invention relates to a granulator for producing granulate from molten plastic with a cutter head displaceable over an adjustment range, said cutter head cooperating with a die plate dispensing the plastic melt, said cutter head being connected to a drive shaft of a drive motor containing a stator and a drive rotor and being axially displaceable with respect to the die plate.

In such granulators, according to the prior art, for the axial displacement of the cutter head, use is made of the principle published, for example, in DE 44 08 235 C1, whereby a cutter shaft coaxial with a drive motor shaft is axially displaced by a stationary drive motor through the intermediary of a coupling, a cutter head being attached to the end of the cutter shaft facing away from the drive motor, said cutter head cooperating with a die plate. The axial displacement of the cutter shaft is performed, firstly, to compensate for wear occurring on the cutters of the rotating cutter head and, secondly, if required, also for a special setting of a cutting gap between the cutters of the cutter head and the die plate. The displacement of the cutter shaft requires considerable technical effort and expense, which must be taken into consideration in the region between drive motor and die plate by means of a corresponding distance between these two components. Apart from the space required, this design also has the consequence that the attachment of the cutter shaft in the vicinity of the cutter head is made more difficult. Such attachment and/or stiffness of the cutter shaft is, however, necessary in order to prevent radial vibrating of the cutter shaft when it rotates, it being the case that unavoidable balance errors may cause an additional disturbance. A further factor is the need to include a coupling between the drive motor and the cutter shaft, through which coupling it is necessary to compensate for the axial displacement of the cutter shaft in relation to the axially fixed shaft of the drive motor. Such an axial coupling naturally causes a certain flexibility of the drive acting on the cutter shaft, this possibly resulting in torsional oscillations of the cutter head, which oscillations are made noticeable by a rattling of the cutter head against the die plate and result in increased wear.

The above-described technique of displacing the cutter shaft with respect to the drive motor is also dealt with in the following publications:

| | |
|---|---|
| German utility model | G 87 01 490.4, |
| | DE 42 39 972 C2, |
| German utility model | DE 201 17 461 U1, |
| | U.S. Pat. No. 3,317,957, |
| | U.S. Pat. No. 4,728,276. |

In connection with granulators in which the cutters of the cutter head cut across the die plate, the principle of a cutter head axially preloaded by a spring has already been used (see U.S. Pat. No. 6,332,765), it being possible for the tension of the spring and therefore the pressing force acting on the die plate to be adjusted as desired by a pneumatically actuated ram held in a hollow shaft of the drive rotor. This arrangement, too, results in considerable structural complexity between drive motor and die plate, apart from the fact that, as already stated, the principle discussed in the publication is used only in connection with a cutter head which is pressed against the die plate.

A prior art similar to that in the above-discussed publication is described in DE 201 17 461 U1, which discloses a granulator with a cutter head which is pressed against the die plate. Used in this case as a kind of spring is a bellows which surrounds the end of the shaft of the drive rotor and which, through being pumped up, extends axially and thus leads to a correspondingly higher contact pressure of the cutter head against the die plate.

The object of the invention is both to reduce the structural complexity of the above-described granulators and also to create a design in which, with compact structural design, the risk of vibrations, torsional oscillations and the like is extensively prevented, it still being possible, however, to precisely adjust the cutter head as desired with respect to the die plate. The object of the invention is achieved in that the drive rotor is axially displaceable in relation to the stator over the adjustment range by means of a linear adjustment element, said stator being fixed with respect to the die plate, said linear adjustment element being fitted between drive rotor and a carrying frame rigidly connected to the die plate, said drive rotor being fixable in said range.

A version based on the same operating principle consists in that the drive motor, containing the drive rotor in fixed axial association, is axially displaceable over the adjustment range by means of a linear adjustment element, said linear adjustment element being fitted between drive rotor and a carrying frame rigidly connected to the die plate, said drive motor being axially fixable in said range.

Owing to this design, the displacement mechanism for the cutter head is directly included in the drive motor, i.e. the drive motor has an uncomplex design in which, of the two essential components of the drive motor, either the drive rotor or the stator, and with it the drive rotor, is displaceable in both directions under the application of force and is fixable, this obviating the entire need for the technical complexity which is required in the prior art, as it were, for lengthening the shaft of the drive rotor with the purpose of displacing the shaft in relation to the drive rotor, because the displaceability and fixability of the component to be adjusted is, as it were, incorporated into that component. This results in a considerable reduction of the technical complexity of the design and in a compactness of the design, this having the effect of a high degree of stability of the guiding of the cutter head, which is given virtually no degree of freedom for any torsional oscillations or the like.

It is in effect known from the German published patent application DE 37 28 868 A1 to provide the rotor of an electric motor in addition to the excitation system for the rotational movement of the rotor with a further excitation system for a relative axial displacement and to control both excitation systems independently of each other. As a special embodiment of the application of this art, the publication refers to the ink ribbon drive in typewriters or similar machines, in which the ink ribbon is transported in steps in its longitudinal direction, but must also be displaceable into at least two heights transverse to the transport direction. However, the idea of the displaceability of the rotor has not found its way into granulator technology, which is dominated by the art explained in the initially mentioned publications, in which art the cutter shaft carrying the cutter head is positioned opposite the axially undisplaceable drive rotor of the drive motor. The invention breaks with this established practice for the design of granulators in that it positions a linear adjustment element on the side of the drive motor facing away from the die plate such that said linear adjustment element is supported, on one side, against the drive shaft of the drive rotor and, on the other side, against a stationary bearing fixed to the die plate and is thereby able to introduce considerable forces into the system.

If the drive rotor is displaceable, it is advantageous to design the granulator such that the drive rotor is held in rolling bearings at either end in the stator, the outer rings of said rolling bearings being axially displaceable in a housing of the drive motor. In this design, the outer rings of the rolling bearings are used at the same time as axial sliding bearings without this requiring any particular complexity of the design, apart from the provision of sufficiently long seats of the outer rings in the housing of the stator 9.

For the axial displacement of the drive rotor it is advantageous to use a linear drive in such a manner that the drive rotor is supported on the linear drive through the intermediary of a rotary decoupling device. The linear drive may be a hydraulic, pneumatic or electric drive, particularly with stepping control. The rotary decoupling device used in this connection ensures that, despite its rotation, the drive rotor is provided with axial support, without the element against which it is supported being co-rotated. The rotary decoupling is accomplished already by the rolling bearings, this providing the shaft of the drive rotor both with the required rotation and also with the axial support.

If the drive motor is displaceable, it is advantageous for the housing of the drive motor to be held on a linear guide. Axially displaced with the housing in this case is both the stator and also the drive rotor, as a consequence of which there is no need for special displacement elements just for the drive rotor. If the housing is displaced, it is advantageous for it to be connected to a linear drive, which then acts directly on the housing.

Example embodiments of the invention are shown in the drawings, in which.

Figure 1:
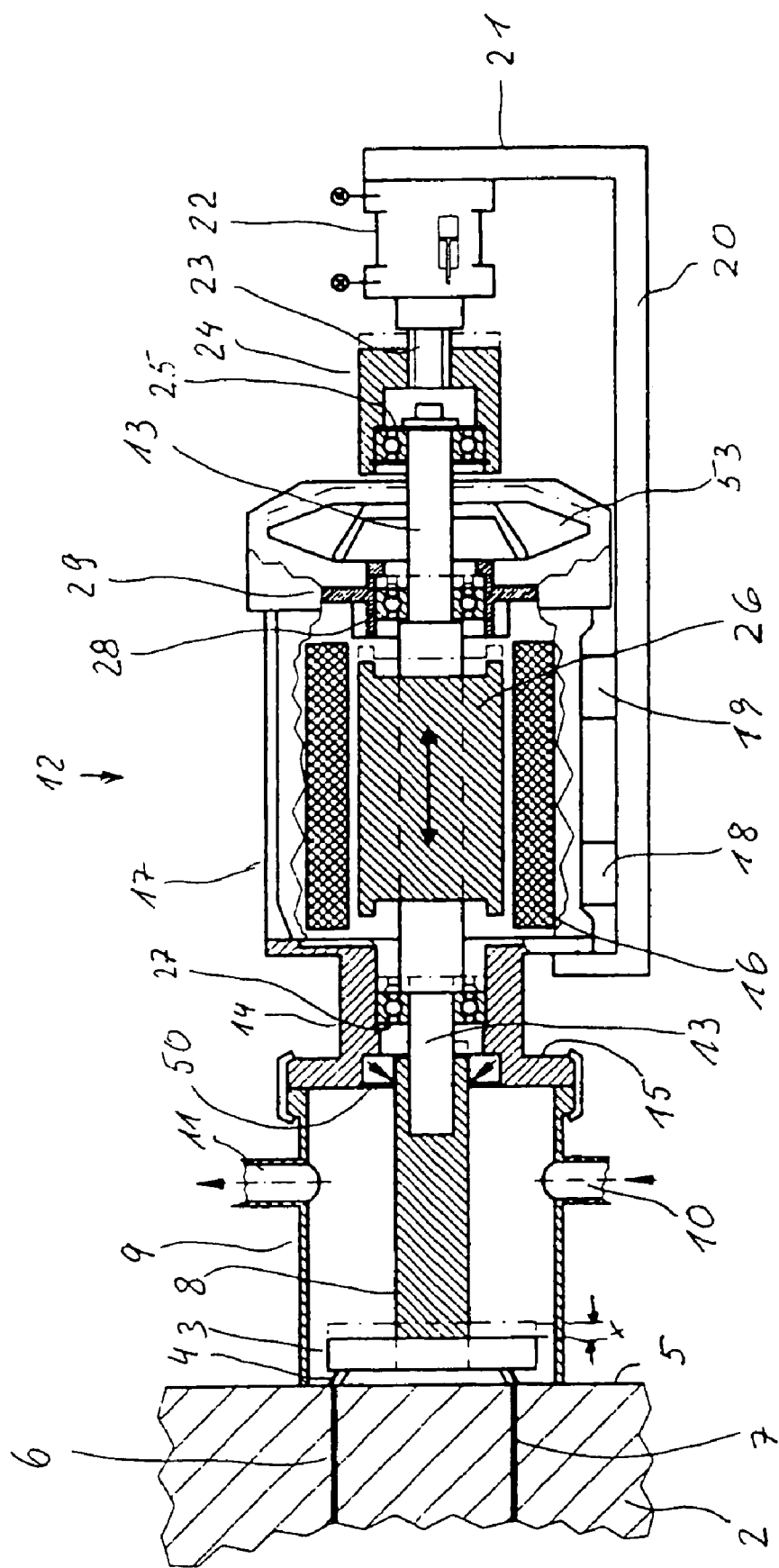
FIG. 1 shows the granulator with the drive motor, the drive rotor of which is displaceable.

FIG. 1 shows the granulator 1 with the die plate 2 and the rotating cutter head 3, the cutters 4 of which sweep the delivery side 5 of the die plate 2 and cut up plastic melt emerging from the nozzles 6 and 7 to form granulate. The die plate 2 contains a large number of annularly disposed nozzles 6 and 7, which are not visible in FIG. 1. This design is a known arrangement.

The cutter head 3 is set in rotation by the rotor shaft 8, which is accommodated, together with the cutter head 3 and the cutters 4, in the housing 9, said housing 9 being subjected to the throughflow of a cooling medium, which flows into the inlet 10 and flows out through the outlet 11, the cooling liquid entraining the granulate which has been cut by the cutters 4 and transporting the granulate out of the housing 9. The housing 9 is permanently connected to the die plate 2.

The rotor shaft 8 is connected to the drive shaft 13 of the drive motor 12, e.g. by screwing or pinning. The inner space of the housing 9 is sealed from the outside by the shaft seal 50, which presses on one side against the rotor shaft 8 and is held on the other side in the tube piece 14, which forms a part of the housing 9 by means of its flange 15. The drive shaft 13 continues into the drive rotor 26 and carries said drive rotor 26, which may be a known squirrel-change rotor of an electric asynchronous machine. The drive rotor 26 rotates in the stator 16, which is supplied in known manner (not shown here in detail) with the necessary electric energy for setting the drive rotor 26 in rotation. The stator 16 is held in known and conventional manner in the motor housing 17. The motor housing 17 rests via the two supports 18 and 19 on the carrying frame 20, which is stationary together with the die plate 2, as a consequence of which the distance between the die plate 2 and carrying frame 20 is permanently fixed.

Attached to the leg 21 of the carrying frame 20 is the linear adjustment element 22, which is formed by a known linearly acting displacement means, e.g., as indicated symbolically in the linear adjustment element 22, by a piston-cylinder unit. The linear adjustment element 22 acts through the intermediary of its axially displaceable ram 23 on the components disposed between it and the rotor shaft 8 (see below), as a result of which the displacement of the ram 23 acts on the rotor shaft 8 and therefore on the cutter head 3. This results in a desired setting together with the cutters 4, particularly in order to compensate for wear, the cutters 4 both being brought into contact with the die plate 2 and also being positioned at a certain distance from the die plate 2. Consequently, there is a rigid connection between the linear adjustment element 22 and the die plate 2 through the intermediary of the carrying frame 20, the tube piece 14 and the housing 9.

The ram 23 is permanently connected to the bell-shaped transmission element 24, which carries in its hollow space the therein fixed rolling bearing 25. The inner ring of the rolling bearing 25 is permanently seated on the end of the drive shaft 13, this providing a permanent connection between the ram 23 and the drive shaft 13. The axial displacement of the ram 23, therefore, is transmitted directly and without change to the drive shaft 13, the transmission element 24 acting with the rolling bearing 25 as a rotary decoupling device. Consequently, when the ram 23 is displaced, this results in a corresponding displacement of the drive shaft 13, of the drive rotor 26 (in relation to the stator 16) and of the rotor shaft 8 together with the cutter head 3 and the cutters 4, as a result of which the displacement of the ram 23 defined by the linear adjustment element 22 is transmitted in precisely the same length to the cutter head 3 and the cutters 4.

The above-described axial displacement of the drive shaft 13 is made possible in that said drive shaft 13 is held in the two rolling bearings 27 and 28, each of which, with its outer ring, is axially slidingly held on one side in the tube piece 14 and on the other side in the housing flange 29 of the motor housing 17. Owing to their sliding seating, therefore, the two rolling bearings 27 and 28, fixedly seated on the drive shaft 13, are able, when the drive shaft 13 is axially displaced, to move accordingly in relation to the tube piece 14 and the housing flange 29, this being indicated by the dash-dotted limiting lines to the right of the rolling bearings 27 and 28 (adjustment range x). This displacement is likewise represented by similar dash-dotted lines next to the cutter head 3 and the connecting piece 24. Instead of the sliding support of the aforementioned outer rings, it is also possible to employ roller bearing elements. Reference character 53 identifies a fan.

The fitting of the linear adjustment element 22 next to the right-hand end of the drive shaft 13 makes it possible to achieve a compact grouping of cutter head 3, housing 9 and drive motor 12, this being of considerable advantage in comparison with the hitherto conventional arrangement of a linear adjustment element between drive motor and cutter head, particularly because, as clearly shown by the representation in FIG. 1, the axially rectilinear connection of drive motor 12 and cutter head 3 allows a very solid design of these components and their manner of connection, which would, in known embodiments of this kind, be considerably impaired by the positioning in this region of a linear adjustment element.

Figure 2:
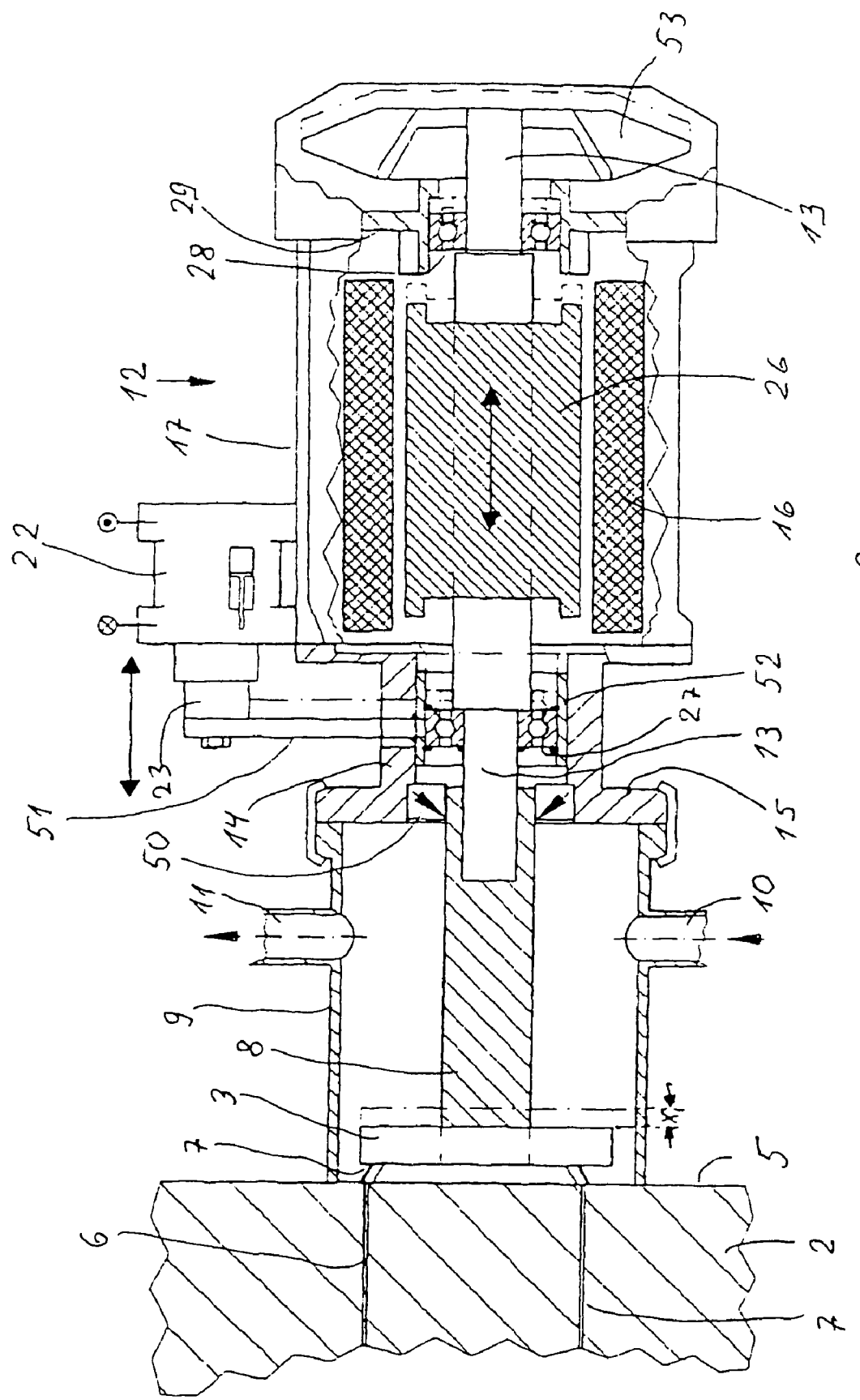
FIG. 2 shows a modification of the arrangement according to FIG. 1.

FIG. 2 shows a modification of the design from FIG. 1 with, as in FIG. 1, a granulator with displaceable drive rotor. Unlike in FIG. 1, in the arrangement according to FIG. 2 the displacement force produced by the linear adjustment element 22 is applied on the side of the drive shaft 13 of the drive motor 12 facing the die plate 2, more specifically in the following manner: the linear adjustment element 22 is fixed on the motor housing 17, which therefore forms the carrying frame, which, in FIG. 1, is formed by the component 20. Consequently, the motor housing 17, the tube piece 14, the flange 15 and the housing 9, permanently connected to the die plate 2, provide a rigid connection between the linear adjustment element 22 and the die plate 2.

Figure 3:
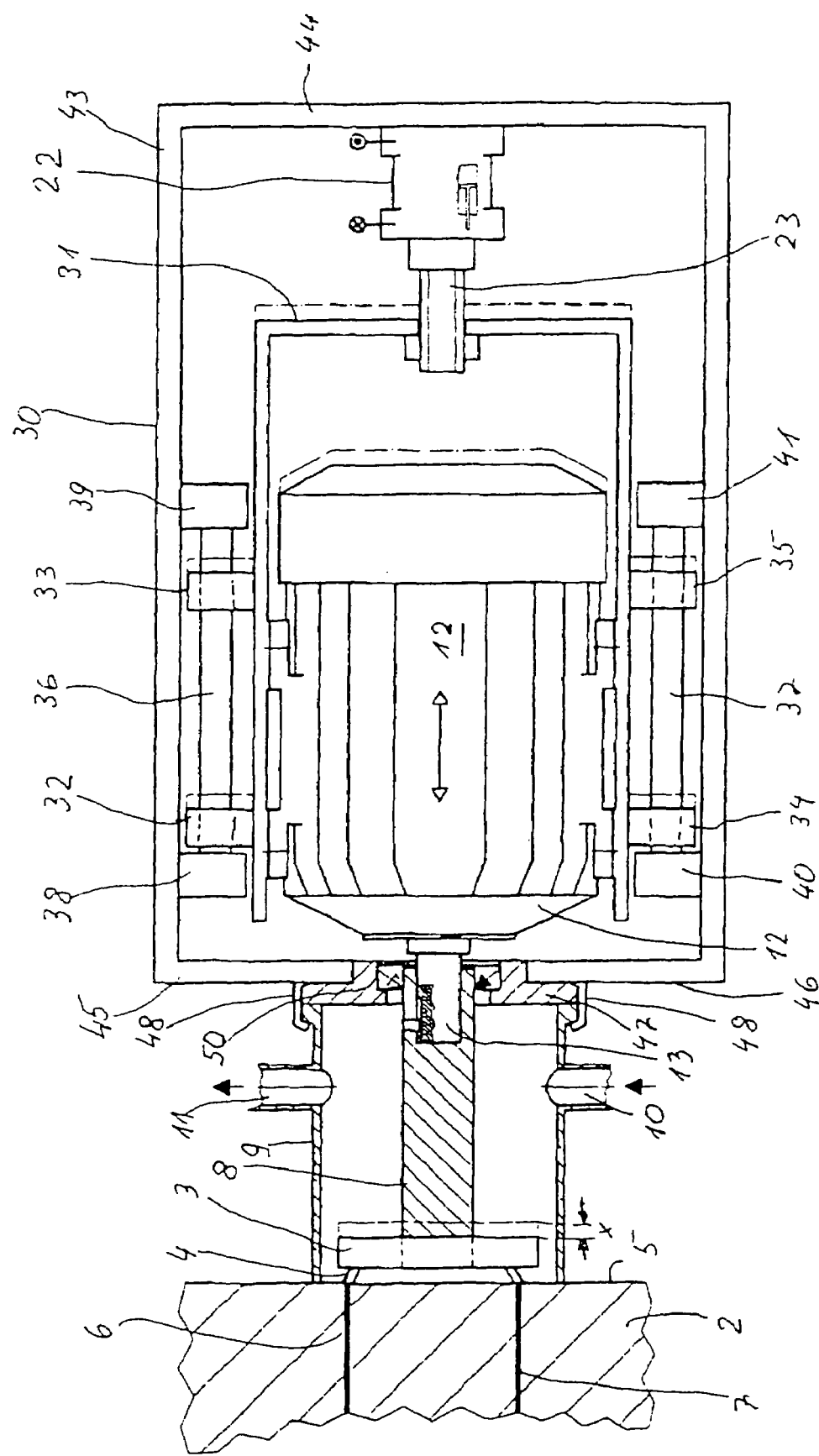
FIG. 3 shows the granulator with the drive motor, which is itself displaceable.

The arrangement according to FIG. 3 represents a modification in comparison with the arrangement in FIG. 1 inasmuch as, in the arrangement according to FIG. 3, the entirety of the drive motor is displaceable. In the area of the granulator 1, the same components are used as presented in FIG. 1, namely the die plate 2 with the nozzles 6 and 7, cutter head 3 with the cutters 4, rotor shaft 8 and housing 9 and shaft seal 50. Disposed on the opposite side of this arrangement is the linear adjustment element 22, which, as described below in detail, effects the displacement of the drive motor 12. With regard to the aforementioned components disposed on either side of the drive motor 12 and presented in FIG. 1, reference is made to the corresponding explanatory remarks in relation to FIG. 1.

In the arrangement according to FIG. 3, the drive motor 12 is held in an enclosure 30 and is permanently connected thereto. The ram 30 is screwed to an end wall 31 of said enclosure 30, with the result that the above-described axial displacement of the ram 23 is transmitted in identical manner to the enclosure 30, which therefore axially displaces the drive motor 12 by the same length. This displacement is made possible in that the enclosure is provided with arms 32, 33 and 34, 35, which are each penetrated by a support shaft 36 and 37 via a sliding seat. The support shafts are fixed in the holders 38, 39 and 40, 41. Because of this supporting of the enclosure 31, said enclosure 31 and, with it, the drive motor 12 can be axially displaced, the arms 32, 33 and 34, 35 sliding along the support shafts 36 and 37. The holders 38, 39 and 40, 41 are attached to the carrying frame 43, which is similar to the carrying frame 20 in FIG. 1. The carrying frame 43 is permanently connected to the die plate 2. By means of its connecting piece 44, the carrying frame 43 holds the linear adjustment element 22, which is attached to the connecting piece 44. The carrying frame 43 extends further to the flange 47, which encloses the shaft seal 50, which, like the identically identified shaft seal in FIG. 1, is in contact with the rotor shaft 8 and therefore seals the housing 9. The housing 9 and the flange 47 are held together by the clamping clips 48. Consequently, there is a rigid connection between the linear adjustment element 22 and the die plate 2 through the intermediary of the carrying frame 43, the flange 47, the clamping clips 48 and the housing 9.

As described in connection with the embodiment in FIG. 1, in the arrangement according to FIG. 3 the axial displacement of the ram 23 acts through the displacement of the drive motor 12 on the cutter head 3 and therefore the cutters 4, which means that, with regard to the setting of these components, there is the same principle of operation as described in connection with FIG. 1.

Attached to the ram 23 of the linear adjustment element 22 is the displacement arm 51, which is permanently connected to the sleeve 52, which is slidingly held in the tube piece 14. Inserted into the sleeve 52 in fixed connection therewith is the rolling bearing 27, which, as in the arrangement according to FIG. 1, is carried by the drive shaft 13 in fixed connection therewith. Therefore, the displacement (see double arrow) of the displacement arm 51 emanating from the linear adjustment element 22 displaces the sleeve 52 and, with it, the rolling bearing 27 and therefore the drive shaft 13 with the drive rotor 26, this resulting, as in the arrangement according to FIG. 1, in a corresponding setting of the cutter head 3.

What is claimed is:

1. Granulator (1) for producing granulate from molten plastic with a cutter head (3) displaceable over an adjustment range (x), said cutter head (3) cooperating with a die plate (7) dispensing the plastic melt, said cutter head (3) being connected to a drive shaft (13) of a drive motor (12) containing a stator (16) and a drive rotor (26) and being axially displaceable with respect to the die plate (7), characterized in that the drive rotor (26) is axially displaceable in relation to the stator (16) over the adjustment range (x) by means of a linear adjustment element (22), said stator (16) being fixed with respect to the die plate (7), said linear adjustment element (22) being fitted between drive rotor (26) and a carrying frame (20) rigidly connected to the die plate (7), said drive rotor (26) being fixable in said range.

2. Granulator according to claim 1, characterized in that the drive rotor (26) is held in rolling bearings (27, 28) at either end in the stator (16), the outer rings of said rolling bearings (27, 28) being axially displaceable in a housing (14, 29) of the drive motor (12).

3. Granulator according to claim 2, characterized in that the drive rotor (26) is supported on a linear adjustment element (22) through the intermediary of a rotary decoupling device (24, 25).

4. Granulator according to claim 3, characterized in that the linear adjustment element (22) is disposed on the side of the drive rotor (26) facing away from the cutter head (3).

* * * * *

UNITED STATES PATENT AND TRADEMARK OFFICE
CERTIFICATE OF CORRECTION

PATENT NO. : 7,273,365 B2  Page 1 of 1
APPLICATION NO. : 10/542429
DATED : September 25, 2007
INVENTOR(S) : Reinhardt-Karsten Mürb It is certified that error appears in the above-identified patent and that said Letters Patent is hereby corrected as shown below:

Correct the title page as follows:

Title page, item (75) inventor: should read --Reinhardt-Karsten Mürb--

Title page, item (73) Assignee: should read --Rieter Automatik GmbH, Grossostheim (DE)--

Signed and Sealed this

Fifteenth Day of April, 2008

JON W. DUDAS
*Director of the United States Patent and Trademark Office*